R. A. FISHER.
Improvement in Tuyere-Tester.

No. 131,866.

Patented Oct. 1, 1872.

Witnesses

Inventor
Robert A. Fisher
per Dewey & Co.
Attys

UNITED STATES PATENT OFFICE.

ROBERT A. FISHER, OF EUREKA, NEVADA.

IMPROVEMENT IN TUYERE-TESTERS.

Specification forming part of Letters Patent No. 131,866, dated October 1, 1872.

*To all whom it may concern:*

Be it known that I, ROBERT A. FISHER, of Eureka, Lander county, State of Nevada, have invented a Tuyere-Tester; and I do hereby declare the following description and accompanying drawing are sufficient to enable any person skilled in the art or science to which it most nearly appertains, to make and use my said invention or improvements without further invention or experiment.

The water tuyeres employed in blast-furnaces are often imperfectly made, and commence to leak water into the furnace soon after they are put into use; but even if perfectly made they eventually burn out and cause a greater or less amount of water to run into the furnace. The result is the cooling of the furnace to a greater or less degree, thereby diminishing its smelting capacity during the time such leaky tuyere remains in the furnace.

Hitherto the only certain means of determining whether or not a tuyere is leaking water has been to withdraw the tuyere from the furnace and examine it. This operation requires the furnace to be temporarily put out of blast, and necessarily occasions great loss of time, and consequently loss of profits.

My invention consists of a device whereby the soundness of a tuyere can be detected almost immediately without removing it from the furnace.

Figure 1:
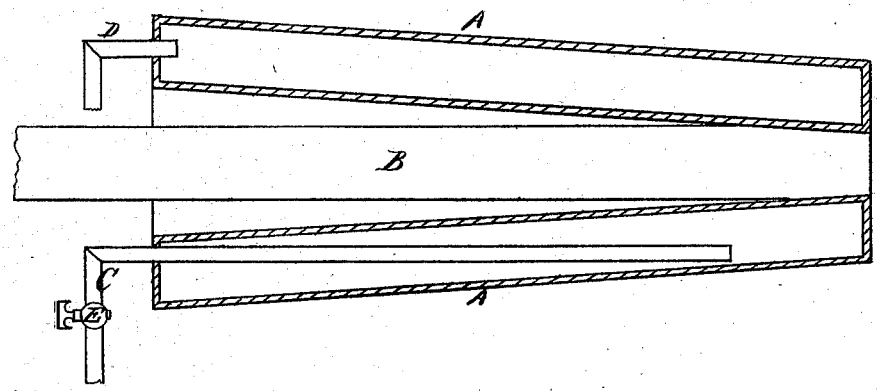

Figure 1 represents a longitudinal section of a common water-tuyere, in which—

A A show the wrought iron part through which the air-blast passes into the furnace by means of the galvanized iron "wind-pipe" B. C represents the supply-pipe through which cold water passes into the tuyere. D shows the discharge-pipe through which the water warmed by passing through the tuyere is carried off. E is a globe-valve or cock by which to regulate or cut off the supply of water that passes into the tuyere.

To determine whether or not a tuyere is leaking it is only necessary to completely arrest the flow of water through the discharge-pipe D, and, by a suitable contrivance, to determine whether water is still flowing through the tuyere. This object may be effected by making a section of the supply-tube of glass, and introducing into the glass tube a spiral, or any contrivance that will show a movement of the water; but I prefer attaching a glass tube to the end of a branch or supplementary discharge-tube more particularly described below.

Figure 2:
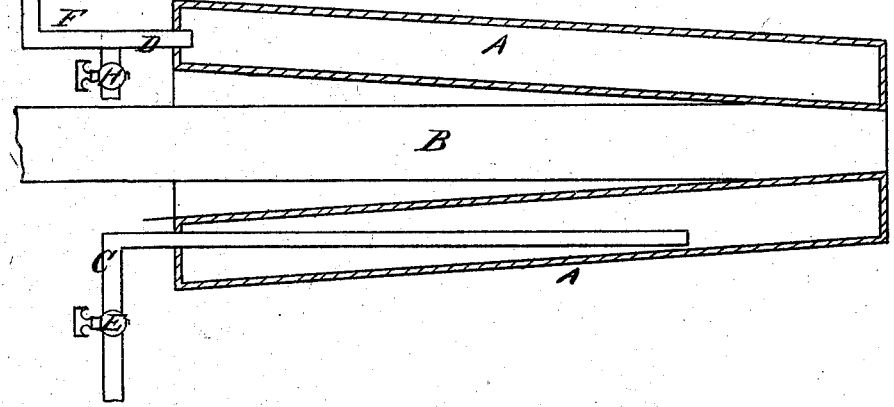

Fig. 2 is intended to show my invention, which consists, first, in branching out the discharge-pipe D by the pipe F bent at an angle and carried to a greater or less distance above the level of the tuyere and terminating the said branch-pipe by a glass tube, G; second, in placing a cock (in Fig. 2 represented at H) at the end of or in connection with the discharge-pipe, whereby the flow of water through the discharge-pipes can be entirely arrested.

To determine whether or not a tuyere is leaking water it is only necessary to close the cock H when the water will rise through the branch F and begin to overflow through the glass tube G; then close the inlet-cock E, and if the tuyere does not leak, the water, as it becomes heated, expands, and there is a gradual overflow from the glass tube G. If the tuyere leaks the water falls in the glass tube G more or less rapidly, according to the size of the hole in the leaky tuyere.

Having thus described my invention, what I claim, and desire to secure by Letters Patent, is—

1. The branch-pipe F, with its glass tube G, in combination with the cocks H and E, substantially as and for the purpose above described.

2. The cock or valve H, or equivalent cut-off, for the purpose specified.

In witness whereof I hereunto set my hand and seal.

ROBERT A. FISHER. [L. S.]

Witnesses:
FRANK A. WISE,
SAMUEL BELL.